US007881551B2

(12) United States Patent
Paik et al.

(10) Patent No.: US 7,881,551 B2
(45) Date of Patent: Feb. 1, 2011

(54) METHOD AND APPARATUS FOR MULTIFOCUS DIGITAL IMAGE RESTORATION USING IMAGE INTEGRATION TECHNOLOGY

(75) Inventors: Joon-Ki Paik, Seoul (KR); Jeong-Ho Shin, Seoul (KR); Maik Vivek, Seoul (KR); Yoon-Jong Yoo, Anyang-si (KR)

(73) Assignee: Chung-Ang University Industry Academic Cooperation Foundation, Heuksuk-Dong, Dongjak-Gu, Seoul (KR)

( * ) Notice: Subject to any disclaimer, the term of this patent is extended or adjusted under 35 U.S.C. 154(b) by 1082 days.

(21) Appl. No.: 11/639,964

(22) Filed: Dec. 15, 2006

(65) Prior Publication Data

US 2007/0286517 A1    Dec. 13, 2007

(30) Foreign Application Priority Data

Jun. 13, 2006   (KR) .................... 10-2006-0053235

(51) Int. Cl.
*G06K 9/40*   (2006.01)
(52) U.S. Cl. ...................................... 382/260; 382/254
(58) Field of Classification Search ................. 382/260
See application file for complete search history.

(56) References Cited

U.S. PATENT DOCUMENTS

| | | | | |
|---|---|---|---|---|
| 6,154,574 A * | 11/2000 | Paik et al. | .................... | 382/255 |
| 6,285,804 B1 * | 9/2001 | Crinon et al. | ................ | 382/299 |
| 6,373,992 B1 * | 4/2002 | Nagao | ......................... | 382/266 |
| 6,628,842 B1 * | 9/2003 | Nagao | ......................... | 382/266 |
| 6,885,762 B2 * | 4/2005 | Saha et al. | .................... | 382/131 |
| 2003/0174900 A1 * | 9/2003 | Puetter et al. | ................ | 382/260 |
| 2004/0156561 A1 * | 8/2004 | Yu-Chuan et al. | ........... | 382/298 |
| 2005/0019000 A1 * | 1/2005 | Lim et al. | ..................... | 386/46 |

OTHER PUBLICATIONS

Shin et al., Multi-object Digital Auto-focusing Using Image Fusion, Springer Berlin/Heidelberg, ACIVS, vol. 3708/2005, Oct. 5, 2005, pp. 202-209.*
Maik et al., Pattern Selective Image Fusion for Multi-focus Image Reconstruction, Springer Berlin / Heidelberg, vol. 3691/2005, Sep. 27, 2005, pp. 677-684.*
Maik, V. et al. "Regularized Image Restoration by Means of Fusion for Digital Auto Focusing;" International Conference CIS, China; Dec. 15, 2005.

* cited by examiner

*Primary Examiner*—David P. Rashid
(74) *Attorney, Agent, or Firm*—Cha & Reiter, LLC (57) ABSTRACT

Methods and apparatus are disclosed for digital image restoration. The method including the steps of receiving an external deteriorated image, and generating N restoration images by using a preset PSF and an image restoration filter without computing a PSF of the input deteriorated image, dividing the restoration images into window parts of a predetermined window size, computing absolute values of differences among peripheral pixels within the divided window parts, selecting only a high frequency part, and analyzing focus deterioration; determining weights of the N restoration images, selecting window parts having high weights, and integrating the selected window parts into one image and comparing a degree of restoration of the integrated image with a preset degree of restoration, and outputting the integrated image as a resultant image when the degree of restoration of the integrated image is higher than the preset degree of restoration.

4 Claims, 8 Drawing Sheets

METHOD AND APPARATUS FOR MULTIFOCUS DIGITAL IMAGE RESTORATION USING IMAGE INTEGRATION TECHNOLOGY

CLAIM OF PRIORITY

This application claims the benefit of the earlier filing date, pursuant to 35 USC 119, to that patent application entitled "Method And Apparatus For Multifocus Digital Image Restoration Using Image Integration Technology" filed in the Korean Intellectual Property Office on Jun. 13, 2006 and assigned Serial No. 2006-53235, the contents of which are hereby incorporated by reference.

BACKGROUND OF THE INVENTION

1. Field of the Invention

The present invention relates to multifocus digital image restoration and more specifically to a method and apparatus to, restore a deteriorated image in an image processing system using an image integration technology by adjusting an unfocused part of an image so as to cause all parts of the image to be focused, thereby restoring the original image.

2. Description of the Related Art

Generally, an automatic focus control algorithm, which is used in camera modules of various apparatuses (e.g. digital cameras, camcorders, computer visions, etc.) photographing an image in a digital manner, is closely associated with the depth of a lens. According to the depth of a lens, a mechanical Auto Focus (AF) or out-of-focus scheme and a pan focus scheme may exist.

A mechanical AF scheme is used in an optical system having a shallow depth, and can adjust the distance between a lens module and a sensor so as to control a focal distance between an object and an image sensor—e.g., a Charge Coupled Device (CCD). Such a mechanical AF scheme is generally applied to a large digital camera, etc.

A second scheme,—pan focus—is used in an optical system having a deep depth, and allows an image to be focused on an image sensor when a focal distance is fixed and only a distance of more than a predetermined range is maintained. Such a pan focus scheme is applied to a camera module, etc., of a mobile communication terminal requiring a small size.

Figure 1:
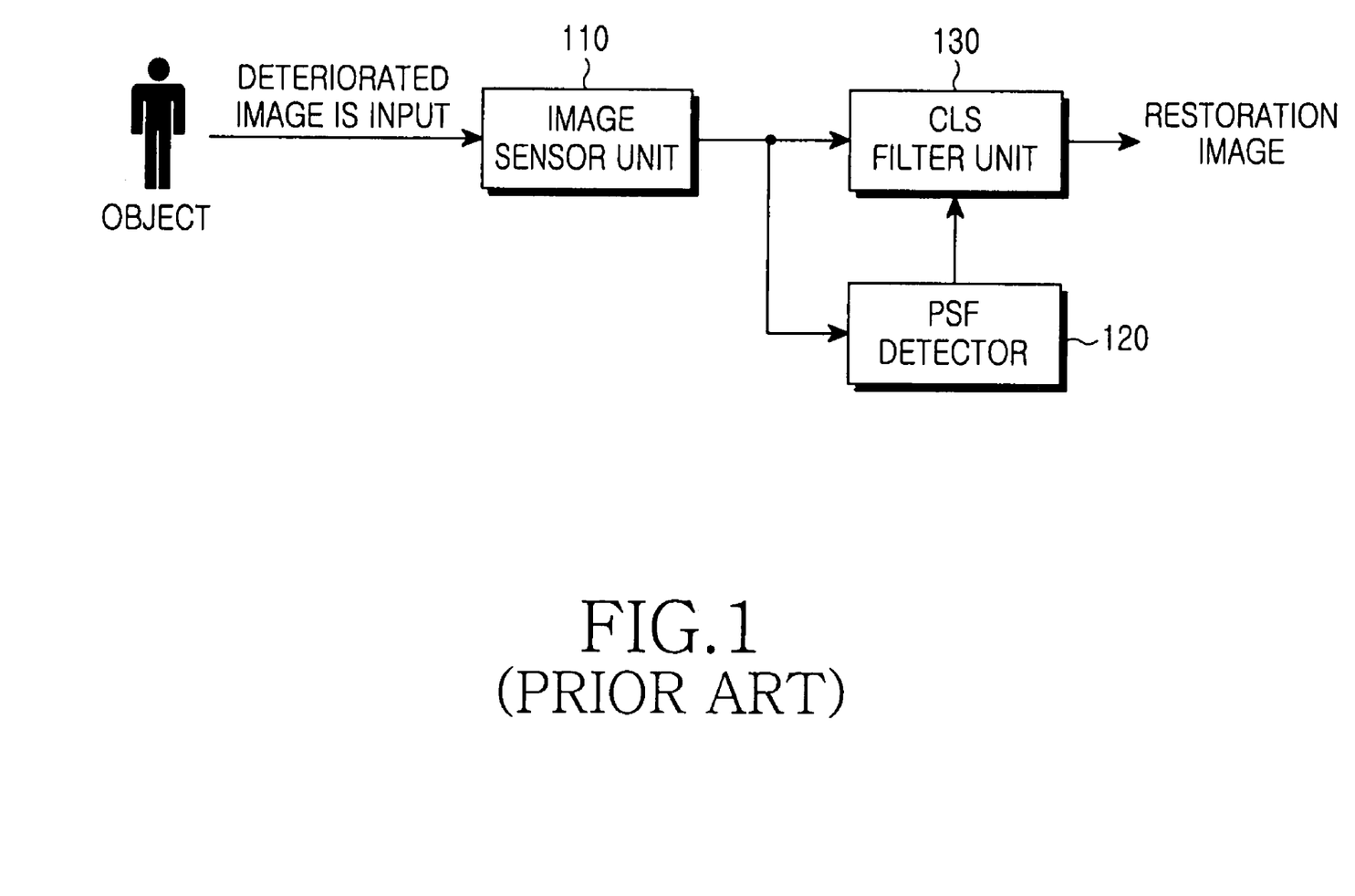
FIG. 1 is a block diagram illustrating the construction of a digital automatic focus control device applied to a conventional digital photographing apparatus.

FIG. 1 is a block diagram illustrating the construction of a digital automatic focus control device applied to a conventional digital photographing apparatus.

Before a description about FIG. 1 is given, the digital automatic focus control device applied to the conventional digital photographing apparatus (e.g. a digital camera, a camcorder, a computer vision, etc.) employs a mechanical AF scheme and a pan focus scheme.

As illustrated in FIG. 1, the conventional digital automatic focus control device employing a mechanical AF scheme or a pan focus scheme includes an image sensor unit 110, a Point Spread Function (PSF) detector 120 and a Constrained Least Squares (CLS) filter unit 130. Hereinafter, the construction of the digital automatic focus control device will be described in more detail. First, the image sensor unit 110 receives an image including multiple objects such as subjects and senses that the received image may be deteriorated. The deteriorated image is transferred to the PSF detector 120. Such an image sensor unit 110 may be constructed as a CCD type, a Complementary Metal Oxide Semiconductor (CMOS) type or a Contact Image Sensor (CIS) type.

The PSF detector 120 receives the deteriorated image from the image sensor unit 110, detects a PSF necessary for image restoration based on the received deteriorated image, and transfers the detected PSF to the CLS filter unit 130.

The PSF detector 120 further includes a database (not shown) storing a plurality of PSFs preset according to distances from a specific focus position, determines a PSF of the best quality according to distances from the database, and may also transfer the determined PSF to the CLS filter unit 130.

The CLS filter unit 130 forms a CLS image restoration filter by using the PSF transferred from the PSF detector 120, and restores the deteriorated image.

Figure 2:
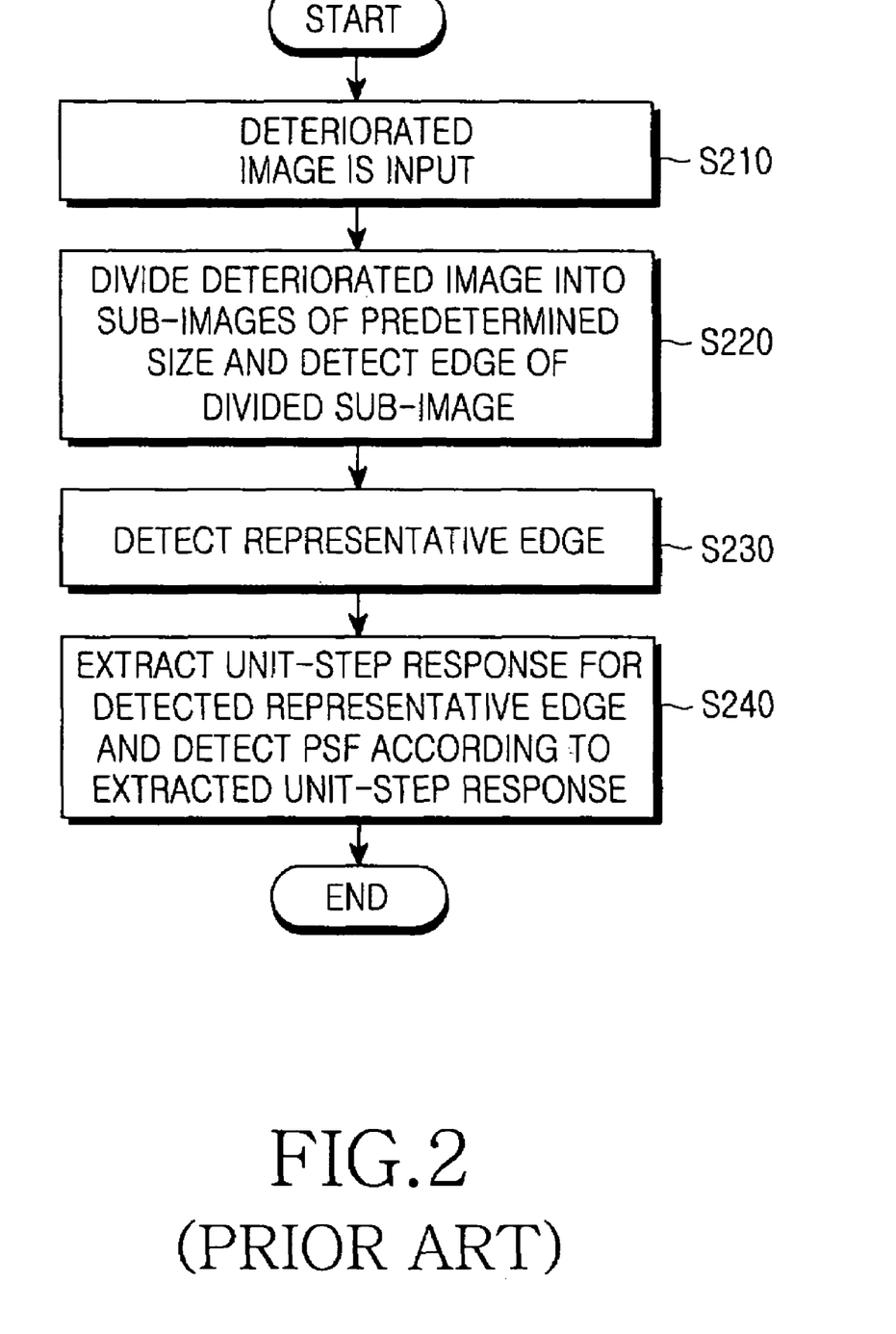
FIG. 2 is a flow diagram illustrating a process by which the PSF detector of FIG. 1 detects a PSF.

FIG. 2 is a flow diagram illustrating a process by which the PSF detector of FIG. 1 detects the PSF.

In FIG. 2, a case where the PSF detector 120 does not include the database storing the PSFs will be described as an example.

More specifically, when the deteriorated image is input from the image sensor unit 110 (S210), the PSF detector 120 divides the deteriorated image into sub-images of a predetermined size by using a canny filter and a line filter provided therein, and detects the edges of the divided sub-images (S220). Then, the PSF detector 120 detects a representative edge having a pixel value greater than a threshold value (S230). If the representative edge is detected, the PSF detector 120 extracts a unit-step response for the detected representative edge, and detects a PSF based on the extracted unit-step response.

According to the conventional digital automatic focus control method as described above, the input image is divided into sub-images of a predetermined size, each edge direction is estimated, unit-step response functions in each edge direction are computed, and an average of the computed unit-step response functions is calculated, so that the PSF is determined (S240). The PSF determined in this way is transferred to the CLS filter unit 130. The CLS filter unit 130 filters and restores the deteriorated image by using the transferred PSF through the CLS image restoration filter.

However, in the digital automatic focus control device of a mechanical AF scheme applied to the conventional camera module, only a specific part of an image is well focused and remaining parts are unfocused, which is different than a pan focus scheme of a fixed focus system in which all parts of an image are focused. In such a case, a clearly restored image can be obtained in a set position, but the substance of an object cannot be understood in remaining positions.

Further, when the PSF is detected in order to restore the deteriorated image, a complicated calculation must be repeated until the PSF satisfies a predetermined level of reliability. Therefore, significant time is required, and thus the deteriorated image cannot be restored in real-time.

SUMMARY OF THE INVENTION

Accordingly, the present invention has been made to solve the above-mentioned problems occurring in the prior art, and an object of the present invention is to provide a method and an apparatus for digital multifocus restoration using an image integration technology, in which a digital automatic focus control device applied to a camera module of a conventional digital photographing apparatus generates a plurality of restoration images from an input deteriorated image by using a preset PSF in a repetitive manner, without a calculation process for detecting a PSF in the restoration of a deteriorated image, and selects and integrates a focused part from each restoration image, or divides the deteriorated image according to PSFs so as to detect PSFs in respective divided parts, so that all parts of the image are caused to be focused and the original image can be restored.

In accordance with one aspect of the present invention, there is provided a multifocus digital image restoration method using an image integration technology, the method including the steps of receiving an external deteriorated image, and generating N restoration images by using both a preset Point Spread Function (PSF) and an image restoration filter without computing a PSF of the input deteriorated image, dividing the restoration images into window parts of a predetermined window size, computing absolute values of differences among peripheral pixels within the divided window parts, selecting only a high frequency part within the window part, and analyzing focus deterioration, determining weights of the N restoration images by using the analyzed focus deterioration, selecting window parts having high weights based on the determined weights, and integrating the selected window parts into one image, and comparing a degree of restoration of the integrated image with a preset degree of restoration, and outputting the integrated image as a resultant image when the degree of restoration of the integrated image is higher than the preset degree of restoration.

BRIEF DESCRIPTION OF THE DRAWINGS

The above features and advantages of the present invention will be more apparent from the following detailed description taken in conjunction with the accompanying drawings, in which.

DETAILED DESCRIPTION

Exemplary embodiments of the present invention will be described in detail herein below with reference to the accompanying drawings. It should be noted that, in the following description, a detailed description of known functions and configurations incorporated herein will be omitted when it may obscure the subject matter of the present invention.

In describing embodiments of the present invention, a digital multifocus restoration apparatus, which employs a mechanical AF scheme instead of a fixed focus system, applied to the camera module of an apparatus photographing an image in a digital manner will be described as an example.

Preferably, in embodiments of the present invention, an apparatus photographing an image in a digital manner includes a digital camera, a camcorder, a computer vision, a mobile communication terminal, etc., which has a camera module.

Figure 3:
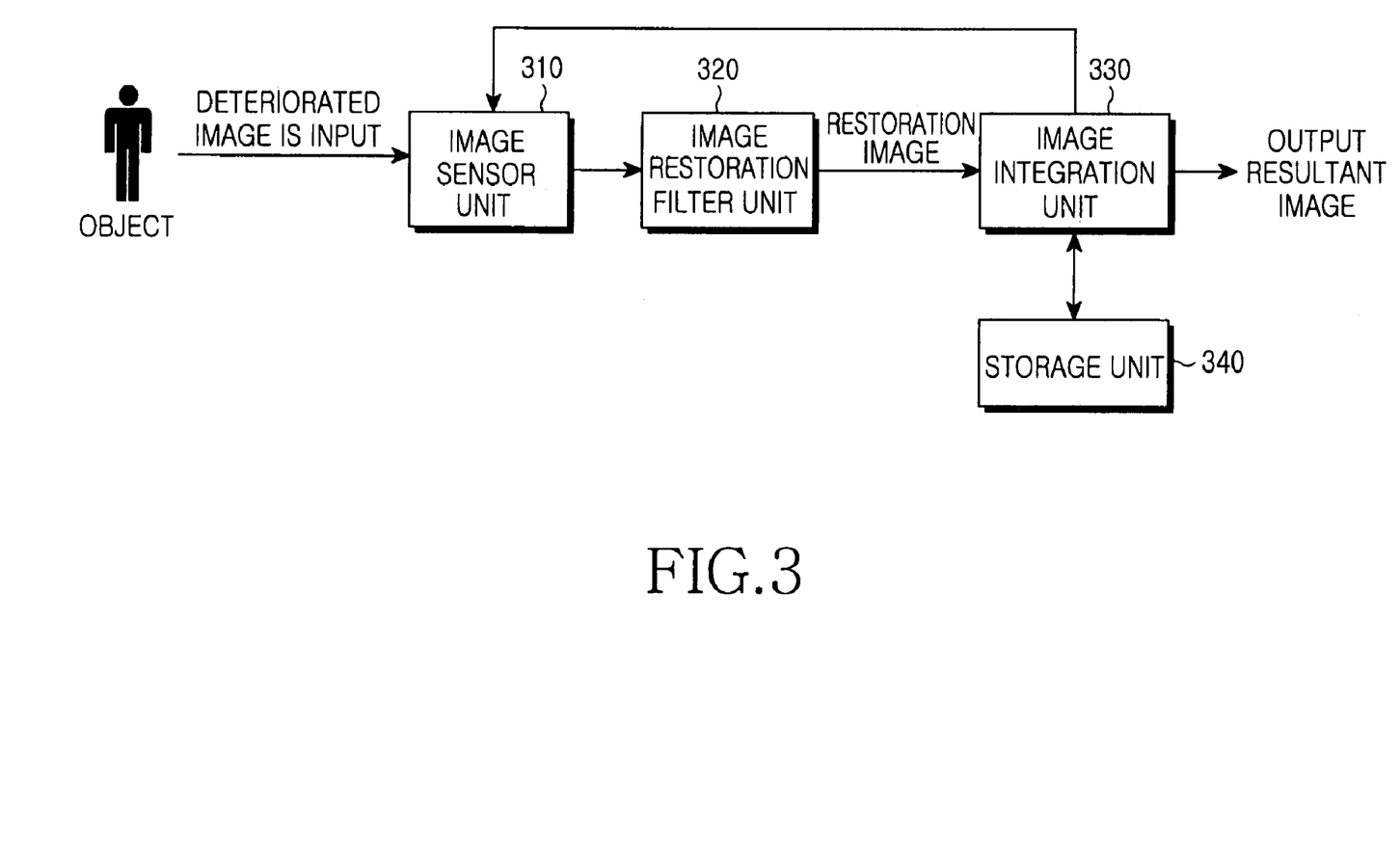
FIG. 3 is a block diagram illustrating the construction of a digital multifocus restoration apparatus using an image integration technology according to an embodiment of the present invention.

FIG. 3 is a block diagram illustrating the construction of a digital multifocus restoration apparatus using an image integration technology according to an embodiment of the present invention.

The digital multifocus restoration apparatus integrates repetitively restored images by using a preset PSF without a calculation process for detecting a PSF in the restoration of an input deteriorated image, or divides a deteriorated image according to PSFs (or objects) so as to estimate PSFs in each part, restores each of the parts, and integrates the restored parts, thereby causing all parts of the image to be focused, and the original image to be restored.

Referring to FIG. 3, the digital multifocus restoration apparatus of the present invention includes an image sensor unit 310, an image restoration filter unit 320, an image integration unit 330 and a storage unit 340.

The construction of the digital multifocus restoration apparatus according to the present invention will now be described in more detail. First, the image sensor unit 310 receives and senses a deteriorated image including multiple objects such as subjects, and transfers the sensed image to the image restoration filter unit 320. The sensing of the deteriorated image by the image sensor unit 310 denotes a conversion from an image in a special domain to an image in a frequency domain in order to improve the filtering speed when the image restoration filter unit 320 filters the deteriorated image. Such an image sensor unit 310 may be constructed as a CCD type, a Complementary Metal Oxide Semiconductor (CMOS) type and a Contact Image Sensor (CIS) type.

The image restoration filter unit 320 receives the deteriorated image converted to the image in the frequency domain from the image sensor unit 310, filters the deteriorated image by using a preset PSF through an image restoration filter, or divides the deteriorated image according to PSFs (or objects) so as to estimate PSFs in each part, thereby generating N restoration images. After the N restoration images are generated, the image restoration filter unit 320 transfers the N restoration images to the image integration unit 330.

In the embodiment of the present invention, the image restoration filter unit 320 includes the preset PSF and the image restoration filter. In order to generate the N restoration images by using the preset PSF and the image restoration filter, the following two methods may be used.

In the first method, the image restoration filter unit 320 repetitively executes a regularization restoration formula, which is proposed by the present invention, by using the preset PSF, thereby generating the N restoration images. In the second method, the deteriorated image is divided according to PSFs (or objects), and PSFs is estimated in each part, so that the N restoration images are generated.

The first method and the second method for generating the N restoration images according to the embodiment of the present invention will be described in more detail with reference to FIGS. 5 and 6.

As described above, when the N restoration images are generated through use of either of the two methods according to the preset PSF and the image restoration filter included in the image restoration filter unit 320, the image restoration filter unit 320 inversely converts the N restoration images to images in a special domain, and transfers the inversely converted N restoration images to the image integration unit 330.

When the inversely converted N restoration images are input from the image restoration filter unit 320, the image integration unit 330 analyzes the focus deterioration of the N restoration images, and determines the weights of the restoration images based on the analyzed focus deterioration. Then, the image integration unit 330 integrates the N restoration images into one image based on the determined weights.

When the N restoration images are integrated into one image as described above, the image integration unit 330 measures the degree of restoration of the integrated image. When the degree of restoration satisfies a preset value, the image integration unit 330 outputs the integrated image as a resultant image.

The process by which the image integration unit 330 analyzes the focus deterioration, determines the weight and integrates the restoration images into one image will be described in more detail with reference to FIG. 4.

As described above, the digital multifocus restoration apparatus using the image integration technology according to an embodiment of the present invention generates a plurality (N) of restoration images from the deteriorated input image in a repetitive manner according to the preset PSF and the image restoration filter included in the image restoration filter unit 320, without the calculation process for detecting the PSF in the restoration of the input deteriorated image, or divides the input deteriorated image according to PSFs (or objects) so as to estimate PSFs in each part and to generate N restoration images, and selects and integrates parts having high weights from the restoration images, thereby causing the image to be focused and the original image to be restored.

Figure 4:
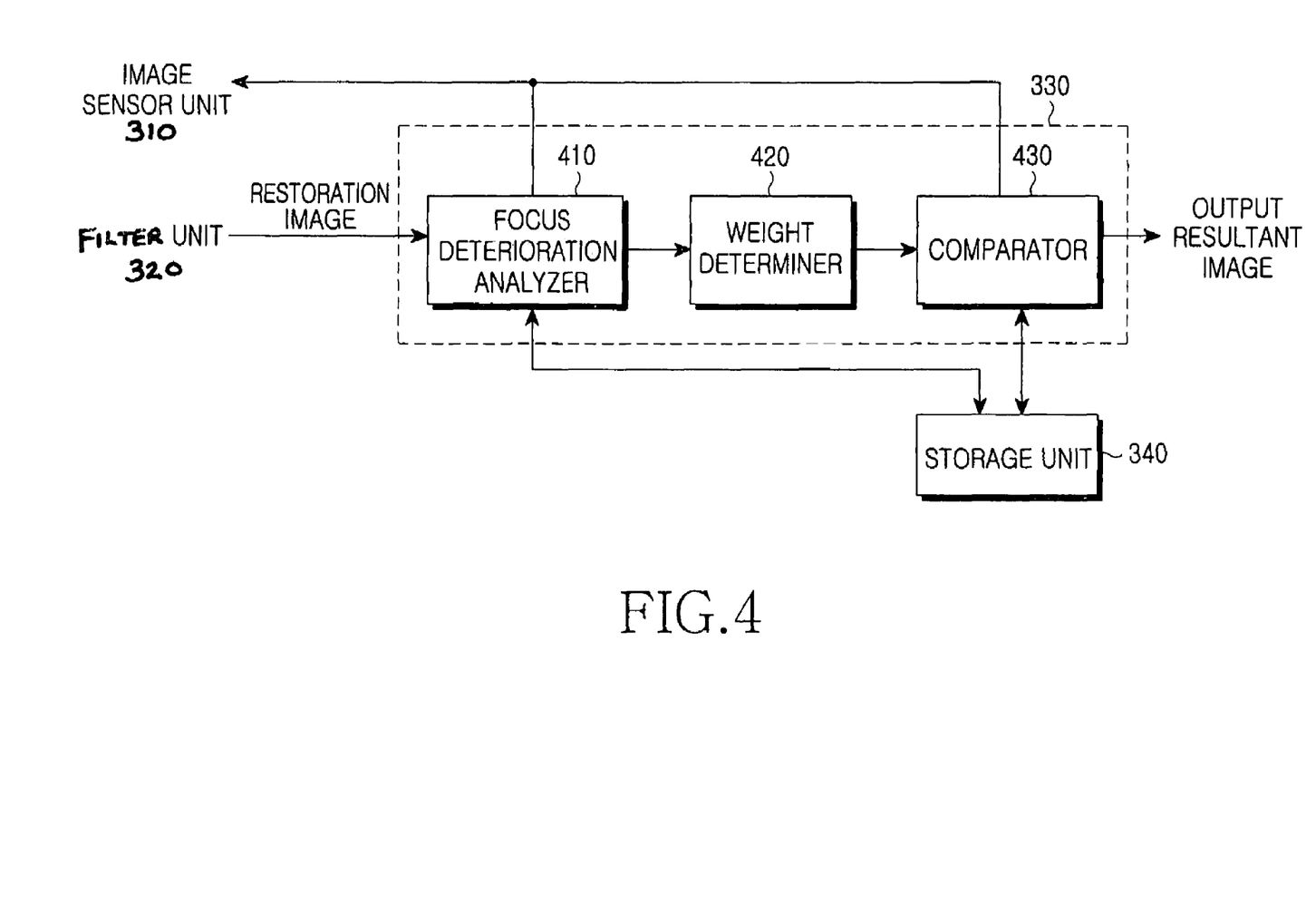
FIG. 4 is a block diagram illustrating in more detail the construction of the image integration unit of FIG. 3.

FIG. 4 is a block diagram illustrating in more detail the construction of the image integration unit of FIG. 3.

Referring to FIG. 4, the image integration unit 330 according to the embodiment of the present invention includes a focus deterioration analyzer 410, a weight determiner 420 and a comparator 430. First, when the restoration image is input from the image restoration filter unit 320, the focus deterioration analyzer 410 analyzes the focus deterioration of the input restoration image, and transfers the analyzed focus deterioration to the weight determiner 420.

The method for analyzing the focus deterioration of the restoration image input from the focus deterioration analyzer 410 may change depending on the PSF and the restoration image filter of the image restoration filter unit 320. In FIG. 4, an example will be described, in which the image restoration filter unit 320 repetitively executes the regularization restoration formula proposed by the present invention by using the preset PSF, thereby generating the N restoration images. The regularization restoration formula proposed by the present invention denotes process of the image restoration filter for filtering the input deterioration image. The image restoration filter unit 320 gradually increases the numerical value of the regularization restoration formula, thereby one to N generating image restoration filters.

If the N restoration images restored based on the regularization restoration formula (i.e. one to N image restoration filters) of the present invention are input from the image restoration filter unit 320, the focus deterioration analyzer 410 divides each of the restoration images into window parts of a predetermined window size, computes the absolute values of differences among peripheral pixels within the divided window parts, and selects only a high frequency part within the window part. The absolute value may be computed through the following equation 1.

$$M_k(i,j)=|2I(i,j)-I(i-1,j)-I(i+1,j)|+ \\ |2I(i,j)-I(i,j-1)-I(i,j+1)| \quad (1)$$

[Please define what is I, i and j]

The focus deterioration analyzer 410 sums up the absolute values computed through equation 1 for each i and j to determine one representative value, and records only the determined representative value that are greater than a predetermined size. The recorded representative value is used for determining a weight in the weight determiner 420.

After the focus deterioration of the restoration images is analyzed and the representative value is determined, the focus deterioration analyzer 410 transfers the recorded representative value to the weight determiner 420.

When the representative value is input from the focus deterioration analyzer 410, the weight determiner 420 determines a weight by using the representative value. In the example in which the image restoration filter unit 320 repetitively executes the regularization restoration formula by using the preset PSF so as to generate the N restoration images, as the numerical value of the regularization restoration formula increases, the degree of the restoration becomes increasingly higher from a state where the degree of the restoration is low. In such a case, the weight determiner 420 gives great weight to an image approximating the final result from among the generated restoration images, while giving small weight to an image not approximating the final result.

After determining the weight of each restoration image by using the analyzed focus deterioration, the weight determiner 420 transfers each restoration image having the determined weight to the comparator 430.

When the restoration images having the determined weight(s) are input from the weight determiner 420, the comparator 430 selects those corresponding parts having high weights so as to integrate the parts into one image. The comparator 430 compares the degree of the integrated image with the preset degree of restoration. When the degree of the integrated image satisfies a predetermined level, the comparator 430 outputs the integrated image as a resultant image, and stops the repetitive execution of the regularization restoration formula.

Figure 5:
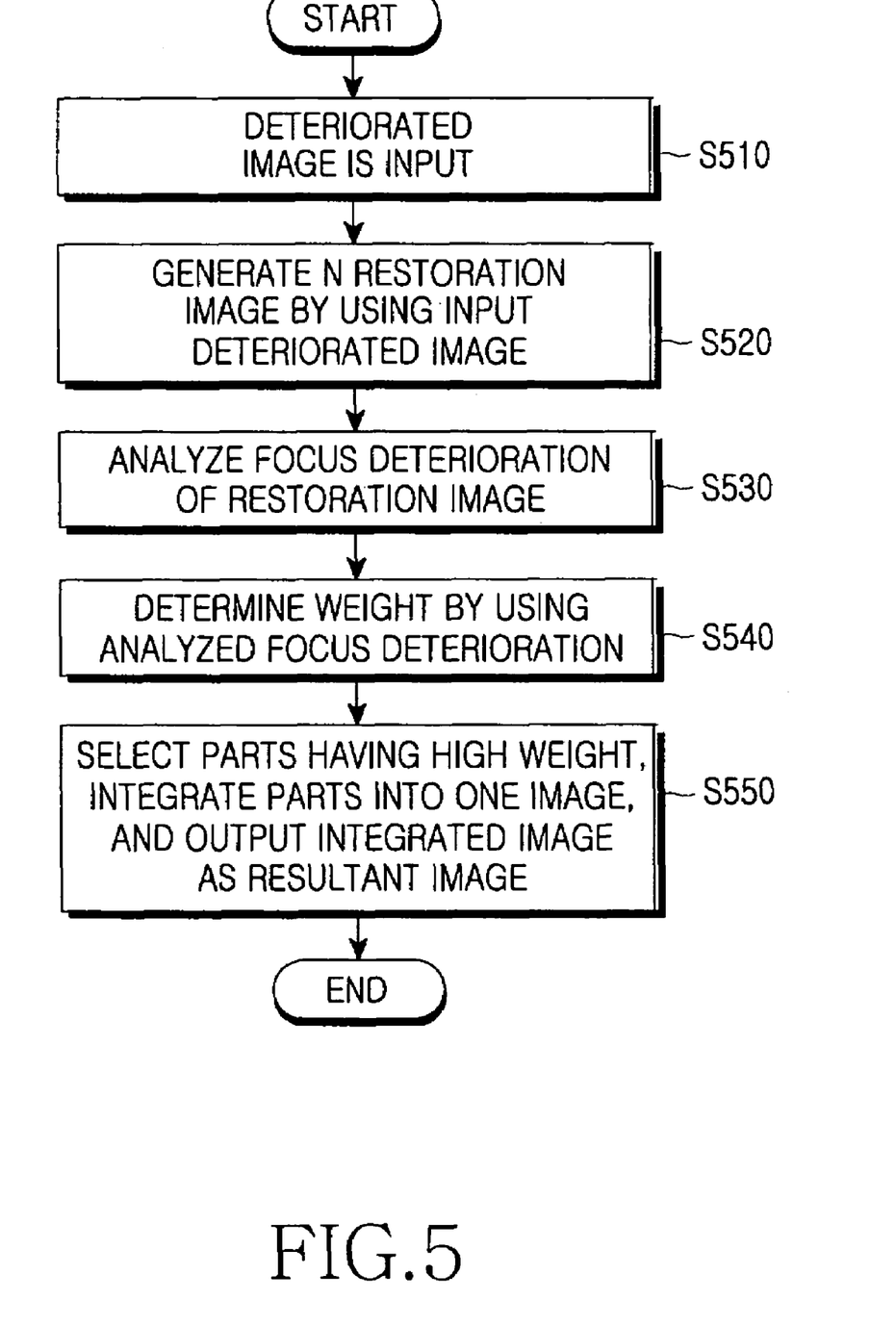
FIG. 5 is a flow diagram illustrating a digital multifocus image restoration process using an image integration technology according to a first embodiment of the present invention.

FIG. 5 is a flow diagram illustrating the multifocus digital image restoration process using the image integration technology according to a first embodiment of the present invention.

In the multifocus digital image restoration process, the image restoration filter unit 320 repetitively executes the regularization restoration formula proposed by the present invention by using the preset PSF, thereby generating the N restoration images.

Referring to FIG. 5, when a deteriorated image including multiple objects, such as subjects, is input to the image sensor unit 310 (S510), the image sensor unit 310 converts the deteriorated input image to an image in a frequency domain, and transfers the converted image to the image restoration filter unit 320. The conversion of the deteriorated image by the image sensor unit 310 provides for improved filtering speed of the input deteriorated image.

The converted image is input from the image sensor unit 310 and the image restoration filter unit 320 generates the N restoration images by using the input deteriorated image (S520).

In the method by which the image restoration filter unit 320 generates the N restoration images by using the input deteriorated image according to the first embodiment of the present invention, the image restoration filter unit 320 repetitively executes the regularization restoration formula proposed by the present invention by using the preset PSF, thereby generating the N restoration images. The regularization restoration formula according to the embodiment of the present invention may be expressed by equation 2 below.

$$x^{(k+1)} = x^{(k)} + \beta[H^T y - (H^T H + \lambda C^T C) x^{(k)}] \quad (2)$$

wherein x and y denote an input image (or a repetition image); and an output image (observation image), respectively; and k and $\beta$ denote the number of repetitions and a threshold value according to repetitions, respectively.

The regularization restoration formula expressed by equation 2 finally denotes the image restoration filter for filtering the input deteriorated image. That is, according to the regularization restoration formula shown in equation 2, $\lambda$ is gradually increased to generate one to N image restoration filters, and N restoration images are generated using the generated image restoration filters. Herein, H denotes one preset PSF, and H as used in the embodiment of the present invention may be expressed by the following (3×3) matrix.

$$H = \begin{pmatrix} 0.044880961 & 0.076616589 & 0.044880961 \\ 0.076616589 & 0.51400980 & 0.076616589 \\ 0.044880961 & 0.076616589 & 0.044880961 \end{pmatrix}$$

In equation 2, C denotes the operator of a linear high pass filter, and C used in the embodiment of the present invention may be expressed by the following a (3×3) matrix.

$$C = \begin{pmatrix} 0 & -1 & 0 \\ -1 & 4 & -1 \\ 0 & -1 & 0 \end{pmatrix}$$

The formulas used in equation 2 are described in detail on p. 397 of a book entitled "Digital Image Processing" by Kenneth R. Castleman and published by the Prentice-Hall in 1996.

In the multifocus digital image restoration process using the image integration technology according to the first embodiment of the present invention as describe above, the image restoration filter unit 320 repetitively executes the regularization restoration formula by using the preset PSF, thereby generating the N restoration images. In the first embodiment of the present invention, $\lambda$ of the regularization restoration formula has an initialization value of 0.01, and the degree of the restoration of an image becomes increasingly higher as the regularization restoration formula is repeatedly executed. If the N restoration images are generated through the afore-described method, the image restoration filter unit 320 inversely converts the N generated restoration images to images on a special domain, and transfers the N converted restoration images to the image integration unit 330.

When the N converted restoration images are input from the image restoration filter unit 320, the image integration unit 330 analyzes focus deterioration in order to determine the weight of the N input restoration images (S530).

According to the method by which the image integration unit 330 analyzes the focus deterioration of the N input restoration images based on the first embodiment of the present invention, when the N restoration images restored based on the regularization restoration formula (i.e. the N image restoration filters) of the present invention are input from the image restoration filter unit 320, the image integration unit 330 divides each of the restoration images into window parts of a predetermined window size, computes absolute values of differences among peripheral pixels within the divided window parts, and selects only a high frequency part within the window part. The absolute values may be computed using equation 1 described in FIG. 4.

If the focus deterioration of the N restoration images is analyzed, the image integration unit 330 determines different weights of the restoration images by using the analyzed focus deterioration (S540). In the example in which the proposed regularization restoration formula is repetitively executed by using the preset PSF so as to generate the N restoration images according to the first embodiment of the present invention, as the numerical value of the repetitive regularization restoration formula increases, the degree of the restoration becomes higher and higher from a state where the degree of the restoration is low. In such a case, the image integration unit 330 gives greater weight to an image approximating the final result from among the generated restoration images, while giving small weight to an image not approximating the final result.

After the weights of the restoration images are determined, the image integration unit 330 selects parts having high weights so as to integrate the parts into one image. That is, the image integration unit 330 compares the degree of the integrated image with the preset degree of restoration. When the degree of the integrated image satisfies a predetermined level, the image integration unit 330 outputs the integrated image as a resultant image, and stops the repetitive execution of the regularization restoration formula (S550). Herein, in the method for integrating the images into one image based on the determined weights of the restoration images, a method according to situations is selectively used from among general image integration methods. That is, a part having a high weight denotes a well focused part in each restoration image. In this way, the well focused parts are selected, so that they can be integrated into one image.

According to the multifocus digital image restoration process using the image integration technology based on the first embodiment of the present invention, the image restoration filter unit 320 repetitively executes the regularization restoration formula (i.e. the filtering of the image restoration filter) proposed in the present invention by using the preset PSF so as to generate the N restoration images, determines the weights of the N restoration images, selects parts having high weights for each restoration image, integrates the parts into one image, thereby outputting the integrated image as a resultant image.

Figure 6:
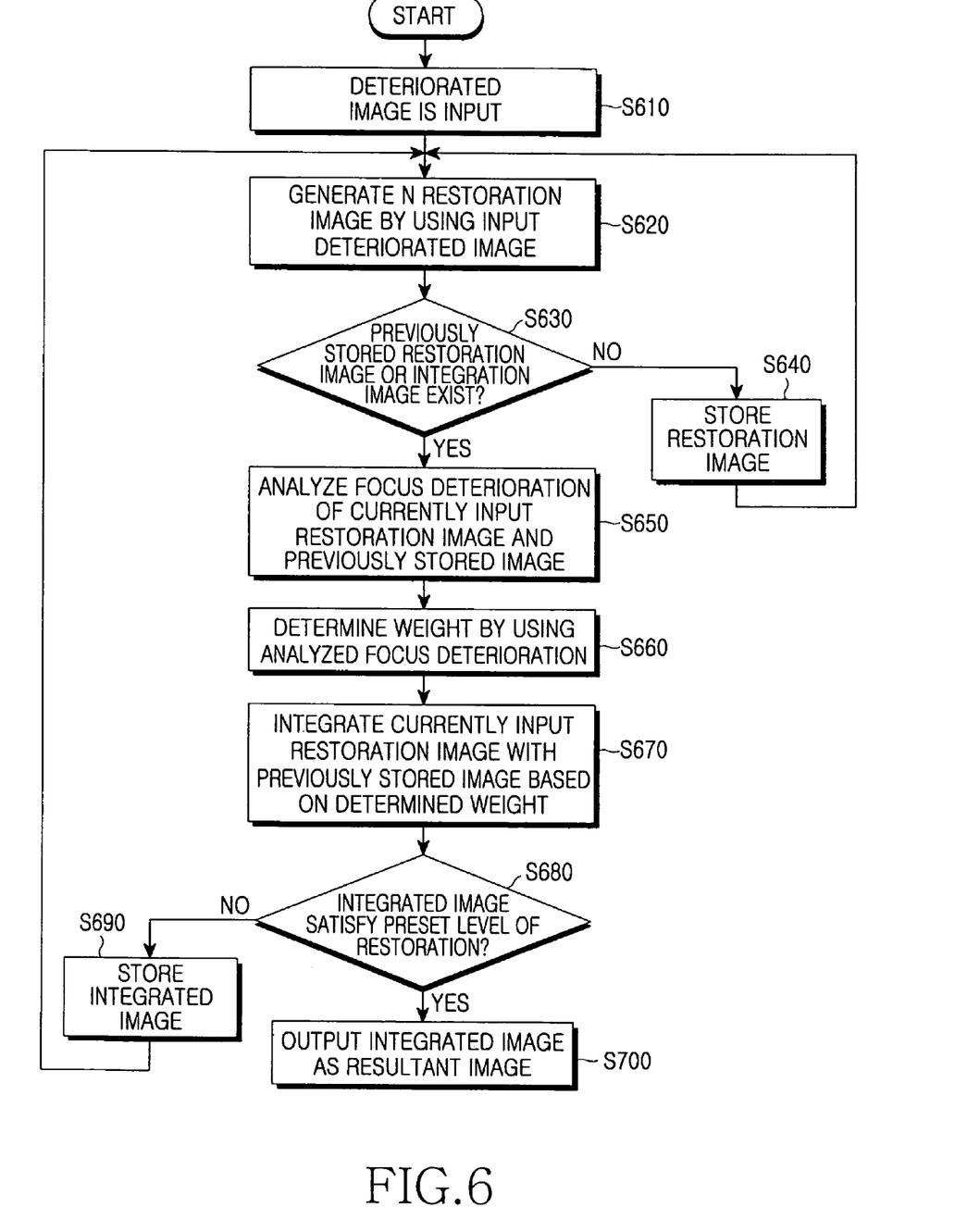
FIG. 6 is a flow diagram illustrating a digital multifocus image restoration process using an image integration technology according to a second embodiment of the present invention.

FIG. 6 is a flow diagram illustrating a multifocus digital image restoration process using an image integration technology according to a second embodiment of the present invention.

In the multifocus digital image restoration process according to the second embodiment of the present invention, a deteriorated image is divided according to PSFs or objects so as to estimate PSFs in each part, thereby generating N restoration images. According to the second embodiment of the present invention, the image restoration filter unit 320 repeats filtering through one image restoration filter by using N number of PSFs having the different degrees of restoration, thereby generating the N restoration images.

Referring to FIG. 6, similarly to FIG. 5, if one deteriorated image including multiple objects, such as subjects, is input to the image sensor unit 310 (S610), the image sensor unit 310 converts the input deteriorated image to an image on a frequency domain, and transfers the converted deteriorated image to the image restoration filter unit 320.

If the converted deteriorated image is input from the image sensor unit 310, the image restoration filter unit 320 generates the N restoration images by using the input converted image (S620).

According to the method by the image restoration filter unit 320 generates the N restoration images by using one deteriorated image based on the second embodiment of the present invention, the image restoration filter unit 320 divides the input deteriorated image according to PSFs having different degrees of restoration depending on the focal distance, and estimates PSFs in each part, thereby generating the N restoration images. More specifically, the PSFs having different degrees of restoration may use PSFs preset according to distances from a specific focal distance. Such a PSF may include a PSF previously calculated in an optical system design step, a PSF detected through an actual experiment, or a PSF estimated in a form of a Gauss function. That is, such a PSF is a value in which the reliability of image restoration is verified.

The image restoration filter is a general image restoration filter used when an image processing system restores a deteriorated image, and may be expressed by equation 3 below.

$$G = \frac{H^*}{|H|^2 + \lambda |C|^2} \quad (3)$$

In equation 3, the deterioration function G of the image restoration filter includes H, which is a PSF denoting the degree of deterioration, a low pass filter C for suppressing the diffusion of noise, and a limitation condition λ capable of adjusting the clearance and the degree of planarization of the original image.

Hereinafter, equation 3 will be described in more detail. A general image restoration system aims at acquiring a restoration image approximating the original image through the deterioration function G. The simplest restoration system uses an restoration filter in which G become zero.

However, the simplest restoration filter diverges when H becomes zero. Further, an image may be broken due to weak noise. Accordingly, in the case of the restoration filter of the present invention, an item is added to prevent the numerator of the filter from becoming zero as expressed by equation 3.

If there is no term λ|C| of the numerator, G becomes 1/H because |H|² is equal to H·H*, where * represents the conjugate. This corresponds to a general restoration filter. Further, C represents a high pass filter. Finally, the term λ|C| denotes a high frequency component. However, the term λ|C| is located in the numerator of equation 3, so that it suppresses a high frequency component and the divergence of an image. As a result, the term |H| of the numerator is dominate of the restoration of an image, the term λ|C| is dominate for suppressing an image, and the clearance and the degree of planarization of an image is adjusted through λ. That is, when λ has a smaller value, the degree of the restoration of an image becomes higher. Therefore, the image becomes clearer (or focused) but the side effect of the image restoration also increases. However, when λ increases in value, the "brokenness" of the image cased by the side effect of the image restoration is less, but the focus of the image is deteriorated.

In the second embodiment of the present invention as described above, the image restoration filter unit 320 divides the input deteriorated image according to PSFs having the different degrees of restoration depending on the image restoration filter and the focal distance, and estimates PSFs in each part, thereby generating the N restoration images. When the N restoration images are generated, the image restoration filter unit 320 inversely converts the N generated restoration images to images in the spatial domain, and sequentially transfers the converted restoration images to the image integration unit 330 one by one according to distances from the specific focal position of a preset PSF.

After one restoration image is sequentially input from the image restoration filter unit 320, the image integration unit 330 determines whether there exists a restoration image or an integrated image stored in advance in the storage unit 340 (S630).

As a result of the determination, when there is no restoration image or integrated image stored in advance in the storage unit 340, the image integration unit 330 stores a currently input restoration image in the storage unit 340 (S640), informs the image restoration filter unit 320 of the storage fact, and sequentially receives a subsequent restoration image according to the distances from the specific focal position of the preset PSF.

If another restoration image is input, the image integration unit 330 determines again if there exists a restoration image or an integrated image stored in advance in the storage unit 340 (S630). If it is determined that there exists the restoration image or an integrated image stored in advance in the storage unit 340, the image integration unit 330 analyzes the focus deterioration of the currently input restoration image and the previously stored image (S650).

According to the method for analyzing the focus deterioration of the currently input restoration image and the previously stored image based on the second embodiment of the present invention, the currently input restoration image and the previously stored image are divided into window parts of a predetermined window size, respectively, absolute values of differences among peripheral pixels within the divided window parts are computed, and only a high frequency part within the window part is selected. The absolute values may be computed through equation 1 described in FIG. 4, similarly to the first embodiment of the present invention.

Further, both differences between the computed pixel and the peripheral pixels and values within a predetermined part (window size) are summed up so as to determine one representative value, and only a representative value of more than a predetermined size is recorded.

If the focus deterioration of the currently input restoration image and the previously stored image is analyzed, the image integration unit 330 determines weights by using the analyzed focus deterioration (S660). Herein, the image integration unit 330 compares the difference values computed from the currently input restoration image and the previously stored image, and determines the weights. This helps to determine the reference of an image in image integration. That is, the fact that difference with the peripheral pixels, i.e. the value of a high frequency, is large, shows that restoration has been well performed. Accordingly, great weight is given to such an image. However, small weight is given to an image having a small difference with the peripheral pixels.

After determining the weights of the currently input restoration image and the previously stored image, the image integration unit 330 integrates the currently input restoration image with the previously stored image based on the determined weight (S670). Herein, an integration scheme may select and use one of various schemes generally used.

If the currently input restoration image is integrated with the previously stored image, the image integration unit 330 determines the degree of restoration of the integrated image (S680). If the integrated image does not satisfy the preset level of restoration desired by a user, the image integration unit 330 stores the integrated image in the storage unit 340 (S690). Then, the image integration unit 330 sequentially repeats the image integration steps of step 620 to 680 according to the distances from the specific focal position of the preset PSF. However, if the integrated image satisfies a preset level of restoration desired by the user, the image integration unit 330 stops the repetition of the image integration and outputs the integrated image as a resultant image (S700). Hereinafter, a method for evaluating the degree of restoration of the integrated image will be described. If a difference value between a current image and a previous image is smaller than a predetermined level, the repetition of the integration steps is stopped. That is, when a threshold value is set to 0.05, if the sum of difference values of pixel values of the current image and the previous image is smaller than 0.05, the repetition of the integration steps is stopped. Such a threshold value may be set using a Signal to Noise Ratio (SNR), a peak Signal to Noise Rate (PSNR), etc., according to user's selection.

FIGS. 7a to 7d are exemplary views of the deteriorated image and resultant image used in the multifocus digital image restoration process using the image integration technology according to the first embodiment of the present invention.

FIGS. 7a to 7d illustrate the deteriorated image and resultant image used in the multifocus digital image restoration process using the image integration technology according to the first embodiment of the present invention described in FIG. 5. In the first embodiment of the present invention, the image restoration filter unit 320 repetitively executes the regularization restoration formula proposed in the present invention by using the preset PSF so as to generate the N restoration images, determines the weights of the N restoration images, selects those parts having high weights for each restoration image, integrates the selected parts into one image, thereby outputting the integrated image as a resultant image.

Figure 7A:
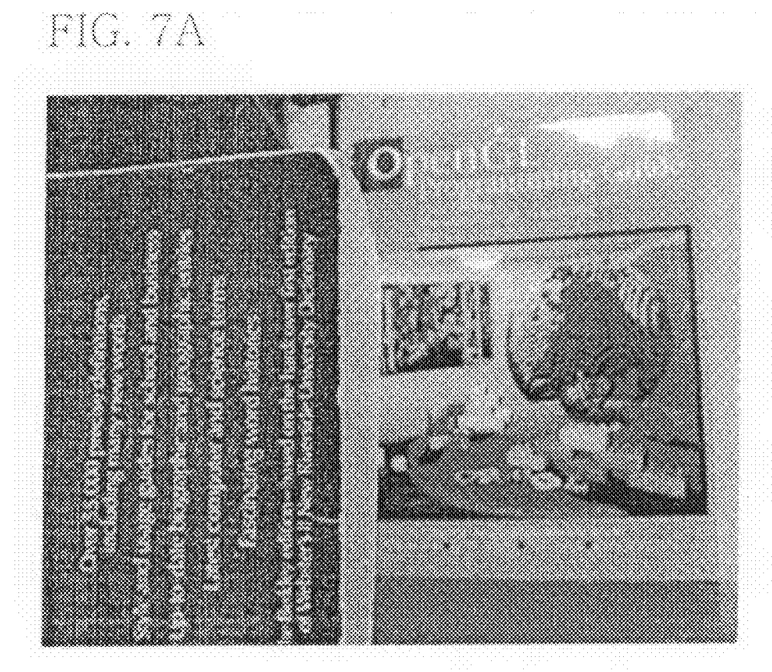
FIGS. 7a to 7d are exemplary views of a deteriorated image and a resultant image used in a digital multifocus image restoration process using an image integration technology according to a first embodiment of the present invention.

In the first embodiment of the present invention, if the deteriorated image of FIG. 7a including multiple objects, such as subjects, is input to the image sensor unit 310, the image sensor unit 310 converts the input deteriorated image to an image in a frequency domain in order to improve filtering speed, and transfers the converted image to the image restoration filter unit 320.

When the converted image is input from the image sensor unit 310, the image restoration filter unit 320 generates the N restoration images using the input deteriorated image.

Herein, the image restoration filter unit 320 according to the first embodiment of the present invention repeats the regularization restoration formula of equation 2 described in FIG. 5, i.e. the filtering of the image restoration filter, by using the preset PSF, thereby generating the N restoration images. Further, H and C applied to equation 2 may be expressed as follows.

$$H = \begin{pmatrix} 0.044880961 & 0.076616589 & 0.044880961 \\ 0.076616589 & 0.51400980 & 0.076616589 \\ 0.044880961 & 0.076616589 & 0.044880961 \end{pmatrix} \text{ and}$$

$$C = \begin{pmatrix} 0 & -1 & 0 \\ -1 & 4 & -1 \\ 0 & -1 & 0 \end{pmatrix}$$

Figure 7B:
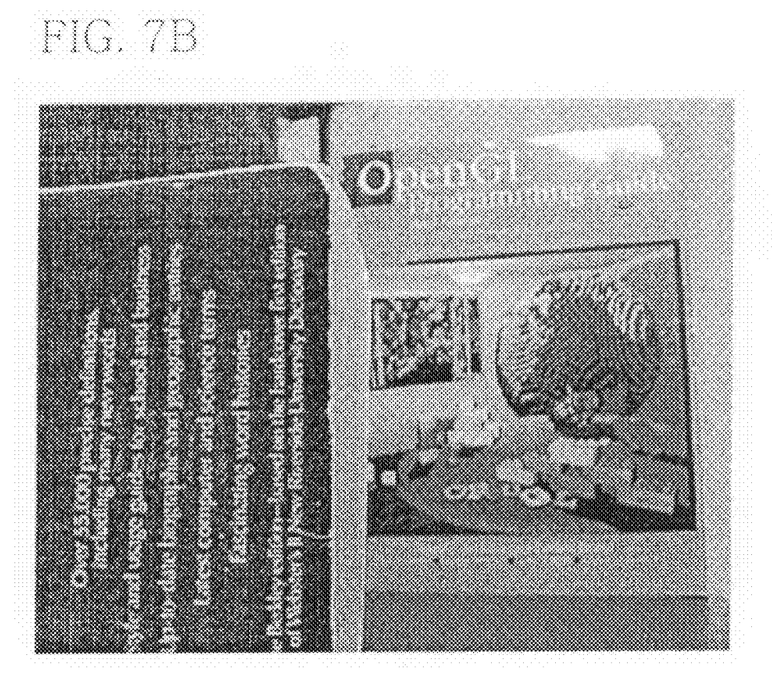
Figure 7C:
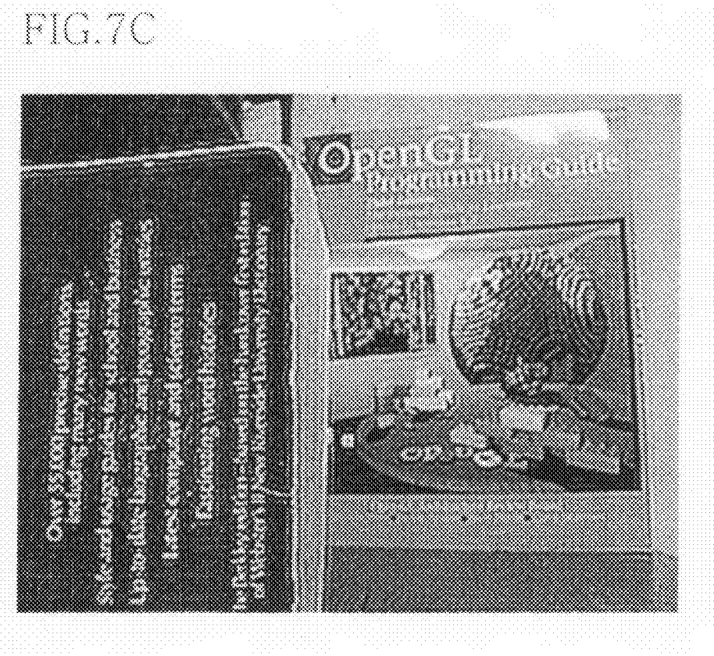

The λ of the regularization restoration formula applied to equation 2 has an initialization value of 0.01, and the degree of the restoration of an image becomes higher and higher as the regularization restoration formula is repeatedly executed. Further, the image restoration filter unit 320 determines the weights of the restoration images generated through the regularization restoration formula, and integrates the restoration images into one image based on the determined weights. FIGS. 7b and 7c illustrate the image obtained by integrating the restoration images based on the weight, the restoration images being generated through the regularization restoration formula.

FIG. 7b illustrates the integrated image when 0.03 is applied to the λ of the regularization restoration formula. As illustrated in FIG. 7b, it can be understood that the focus of the right part in FIG. 7b has become clear as compared to the input deteriorated image of FIG. 7a. FIG. 7c illustrates the integrated image when 0.05 is applied to the λ of the regularization restoration formula. As illustrated in FIG. 7c, it can be understood that all parts in FIG. 7c have become clear as compared to the input deteriorated image of FIG. 7a and the restoration image of FIG. 7b.

Figure 7D:
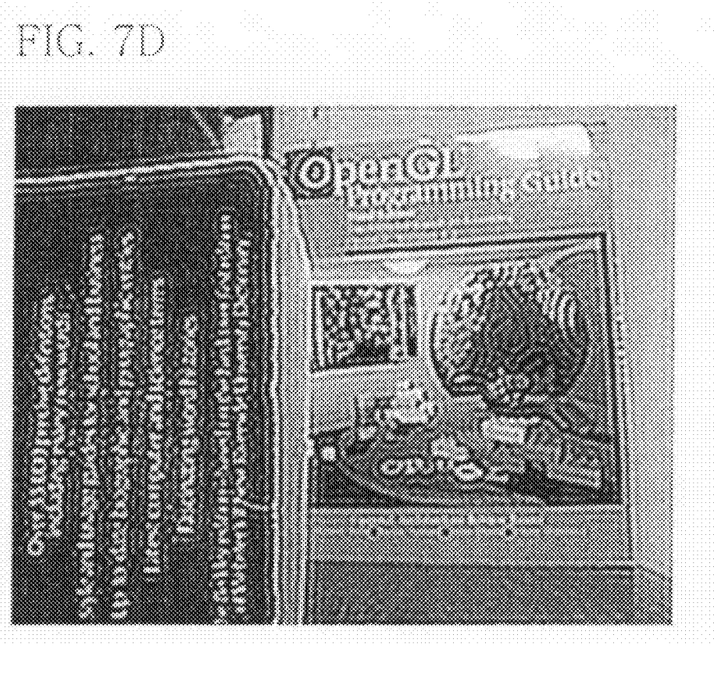

In this way, the λ of the regularization restoration formula is gradually increased, so that it is possible to generate the restoration image increasingly similar to the expected original image. FIG. 7d illustrates the final resultant image according to the first embodiment of the present invention. As illustrated in FIG. 7d, it can be understood that all parts of the image have been focused and have become clear.

As described above, in the restoration of an input deteriorated image, a plurality of restoration images are generated from the input deteriorated image by using a preset PSF in a repetitive manner, without a calculation process for detecting a PSF, and focused parts are selected from each restoration image and are integrated, so that all parts of the image can be focused and the original clear image can be restored.

According to the present invention as described above, a digital automatic focus control device applied to a camera module of a conventional digital photographing apparatus generates a plurality of restoration images from an input deteriorated image by using a preset PSF in a repetitive manner, without a calculation process for detecting a PSF in the restoration of a deteriorated image, and selects and integrates focused parts from each restoration image, or divides the deteriorated image according to PSFs so as to detect PSFs in each part, so that all parts of the image can be focused and the original image can be restored.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although preferred embodiments of the present invention has been described for illustrative purposes, those skilled in the art will appreciate that various modifications, additions and substitutions are possible, without departing from the scope and spirit of the present invention as disclosed in the accompanying claims, including the full scope of equivalents thereof.

What is claimed is:

1. A multifocus digital image restoration method using an image integration technology, the method, operable in a processor coupled to a memory, comprising
causing the processor to:
receive a deteriorated image,
divide the deteriorated image according to preset Point Spread Functions (PSFs) having different degrees of restoration depending on a focal distance without computing a PSF of the deteriorated image,
estimate PSFs in each divided part, generating N restoration images, and sequentially transferring the N restoration images one by one according to the focal distance;
determine whether a previously stored restoration image or an integrated image exists,
analyze focus deterioration of an input restoration image and the previously stored image when it is determined that the previously stored restoration image exists;
compare the analyzed focus deterioration and determining weights of the input restoration image and the previously stored restoration image;
integrate the input restoration image and the previously stored restoration image based on the determined weights;
compare a degree of restoration of the integrated image with a preset degree of restoration, and
output the integrated image as a restoration image when the degree of restoration of the integrated image is higher than the preset degree of restoration.

2. The method as claimed in claim 1, further comprising a step of:
when no previously stored restoration image or integrated image is determined, storing the currently input restoration image in a storage unit, and
sequentially receiving a subsequent restoration image according to the focal distance.

3. The method as claimed in claim 1, wherein, when the degree of restoration of the integrated image is lower than the preset degree of restoration, the integrated image is stored in a storage unit, a subsequent restoration image is sequentially received according to the focal distance, and the step of integrating the images is repeated.

4. The method as claimed in claim 1, wherein, when the focus deterioration of the restoration image and the previously stored image is analyzed, the input restoration image and the previously stored image are divided into window parts of a predetermined window size, respectively, absolute values of differences among peripheral pixels within the divided window parts are computed, and only a high frequency part within the window part is selected.

* * * * *